(12) United States Patent
Morris

(10) Patent No.: US 9,242,419 B2
(45) Date of Patent: Jan. 26, 2016

(54) DIVIDED CONDUIT EXTRUSION DIE AND METHOD

(71) Applicant: Milliken & Company, Spartanburg, SC (US)

(72) Inventor: David Drew Morris, Newnan, GA (US)

(73) Assignee: Milliken & Company, Spartanburg, SC (US)

( * ) Notice: Subject to any disclaimer, the term of this patent is extended or adjusted under 35 U.S.C. 154(b) by 401 days.

(21) Appl. No.: 13/889,828

(22) Filed: May 8, 2013

(65) Prior Publication Data

US 2014/0001671 A1    Jan. 2, 2014

Related U.S. Application Data

(60) Provisional application No. 61/644,761, filed on May 9, 2012, provisional application No. 61/644,760, filed on May 9, 2012, provisional application No. 61/656,290, filed on Jun. 6, 2012, provisional application No. 61/730,526, filed on Nov. 28, 2012, provisional application No. 61/730,525, filed on Nov. 28, 2012.

(51) Int. Cl.
| | | |
|---|---|---|
| *B29D 23/00* | (2006.01) | |
| *B29C 47/02* | (2006.01) | |
| *B29C 53/16* | (2006.01) | |
| *B29C 47/12* | (2006.01) | |
| *B29C 53/18* | (2006.01) | |
| *B29C 53/54* | (2006.01) | |
| *B29C 47/04* | (2006.01) | |
| *B29C 47/00* | (2006.01) | |

(Continued)

(52) U.S. Cl.
CPC .............. *B29D 23/00* (2013.01); *B29C 47/02* (2013.01); *B29C 47/028* (2013.01); *B29C 47/04* (2013.01); *B29C 47/12* (2013.01); *B29C 47/128* (2013.01); *B29C 53/16* (2013.01); *B29C 53/18* (2013.01); *B29C 53/54* (2013.01); *B29C 47/0028* (2013.01); *B29C 47/20* (2013.01); *B29C 47/28* (2013.01); *B29C 47/702* (2013.01); *B29C 47/705* (2013.01); *B29C 47/92* (2013.01); *B29C 2947/92704* (2013.01); *B29D 23/18* (2013.01); *B29D 24/00* (2013.01); *B29L 2023/00* (2013.01); *B29L 2023/005* (2013.01); *B29L 2024/006* (2013.01)

(58) Field of Classification Search
None
See application file for complete search history.

(56) References Cited

U.S. PATENT DOCUMENTS

| | | | |
|---|---|---|---|
| 2,401,550 A * | 6/1946 | Cook, Jr. ................ | B29C 47/02 264/171.21 |
| 3,110,754 A | 11/1963 | Witort et al. .................... | 174/70 |

(Continued)

OTHER PUBLICATIONS

Patent Cooperation Treaty PCT International Search Report. Date of Mailing, Sep. 4, 2013. International Application No. PCT/US2013/040124. International Filing Date, May 8, 2013.

(Continued)

*Primary Examiner* — Jeffrey Wollschlager

(74) *Attorney, Agent, or Firm* — Cheryl J. Brickey

(57) ABSTRACT

An apparatus and method are provided for making a conduit divided into channels by one or more strip-shaped substrates. The channels may be used for cables, such as fiber optic cables, coaxial cables, electrical cables, electrical wiring, and the like. Each divided conduit provides channels that allow e.g., cables to be pulled through without snagging or excessive heat build-up due to friction. In addition, the divided conduits do not allow contact or alternation losses between adjacent cables in other channels of the conduit.

7 Claims, 14 Drawing Sheets

C-C

(51) Int. Cl.
    *B29D 23/18*     (2006.01)
    *B29D 24/00*     (2006.01)
    *B29C 47/70*     (2006.01)
    *B29L 24/00*     (2006.01)
    *B29L 23/00*     (2006.01)
    *B29C 47/20*     (2006.01)
    *B29C 47/28*     (2006.01)
    *B29C 47/92*     (2006.01)

(56) References Cited

U.S. PATENT DOCUMENTS

| | | | | | |
|---|---|---|---|---|---|
| 3,860,686 | A * | 1/1975 | Myers | ............ | B29C 47/02 264/171.14 |
| 4,061,461 | A | 12/1977 | Hessenthaler | ............ | 425/462 |
| 4,157,194 | A * | 6/1979 | Takahashi | ............ | B29C 47/0023 138/109 |
| 4,439,387 | A * | 3/1984 | Hawley | ............ | B29C 47/027 264/108 |
| 4,568,507 | A * | 2/1986 | Baxter | ............ | B29C 47/027 156/244.12 |
| 4,994,047 | A * | 2/1991 | Walker | ............ | A61L 29/06 600/581 |
| 5,045,377 | A * | 9/1991 | Amata | ............ | B29C 47/0014 264/136 |
| 5,055,104 | A * | 10/1991 | Ray | ............ | A61B 17/1757 606/247 |
| 5,374,245 | A * | 12/1994 | Mahurkar | ............ | A61M 25/001 604/43 |
| 5,587,115 | A | 12/1996 | Allen | ............ | 264/1.24 |
| 5,667,818 | A * | 9/1997 | Guillemette | ............ | B29C 47/0016 264/173.16 |
| 5,897,732 | A * | 4/1999 | Schlameus | ............ | B29C 53/52 156/201 |
| 5,900,088 | A * | 5/1999 | Yamagiwa | ............ | B29C 47/0028 156/115 |
| 5,996,639 | A * | 12/1999 | Gans | ............ | B29C 49/0021 138/115 |
| 6,262,371 | B1 * | 7/2001 | Allen | ............ | H02G 1/08 138/116 |
| 6,304,698 | B1 * | 10/2001 | Morris | ............ | G02B 6/4459 138/111 |
| 6,398,190 | B1 * | 6/2002 | Li | ............ | G02B 6/4459 254/134.3 FT |
| 6,783,716 | B2 * | 8/2004 | McCullough | ............ | B29C 47/20 264/171.13 |
| 7,163,388 | B2 * | 1/2007 | Anand | ............ | B29C 47/20 425/131.1 |
| 7,214,880 | B2 * | 5/2007 | Wiekhorst | ............ | H01B 7/0233 174/102 SP |
| 7,670,526 | B2 * | 3/2010 | Solar | ............ | A61M 25/09 156/244.11 |
| 7,850,675 | B2 * | 12/2010 | Bell | ............ | A61M 25/0045 604/523 |
| 7,972,465 | B2 * | 7/2011 | Patterson | ............ | A61M 25/0012 156/244.15 |
| 8,007,700 | B2 * | 8/2011 | Perez | ............ | H01B 3/16 174/110 FC |
| 8,809,682 | B2 * | 8/2014 | Hepfinger | ............ | H02G 9/065 138/115 |
| 9,061,448 | B2 * | 6/2015 | Hepfinger | ............ | B29C 47/0028 |
| 2003/0004493 | A1 * | 1/2003 | Casey | ............ | A61M 25/005 604/525 |
| 2005/0139377 | A1 * | 6/2005 | Levy | ............ | B29C 47/0004 174/110 R |
| 2007/0098940 | A1 * | 5/2007 | Heffner | ............ | H01B 13/14 428/36.9 |
| 2007/0102183 | A1 * | 5/2007 | Jotti | ............ | B29C 47/0019 174/68.1 |
| 2008/0097350 | A1 * | 4/2008 | Bell | ............ | A61M 25/0023 604/266 |
| 2010/0327477 | A1 * | 12/2010 | Sansoucy | ............ | A61M 25/0009 264/148 |
| 2011/0172644 | A1 * | 7/2011 | Zanoni | ............ | A61L 29/18 604/529 |
| 2012/0261062 | A1 * | 10/2012 | Hepfinger | ............ | B29C 47/0028 156/244.13 |
| 2012/0261157 | A1 * | 10/2012 | Hepfinger | ............ | H02G 9/065 174/95 |

OTHER PUBLICATIONS

Patent Cooperation Treaty PCT International Search Report. Date of Mailing, Sep. 4, 2013. International Application No. PCT/US2013040121. International Filing Date, May 8, 2013.

* cited by examiner

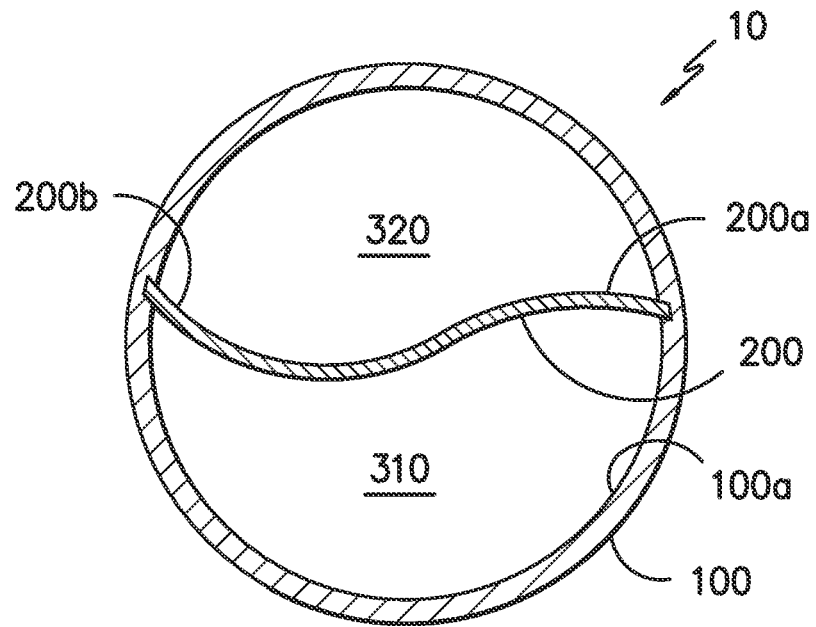
FIG. -1-
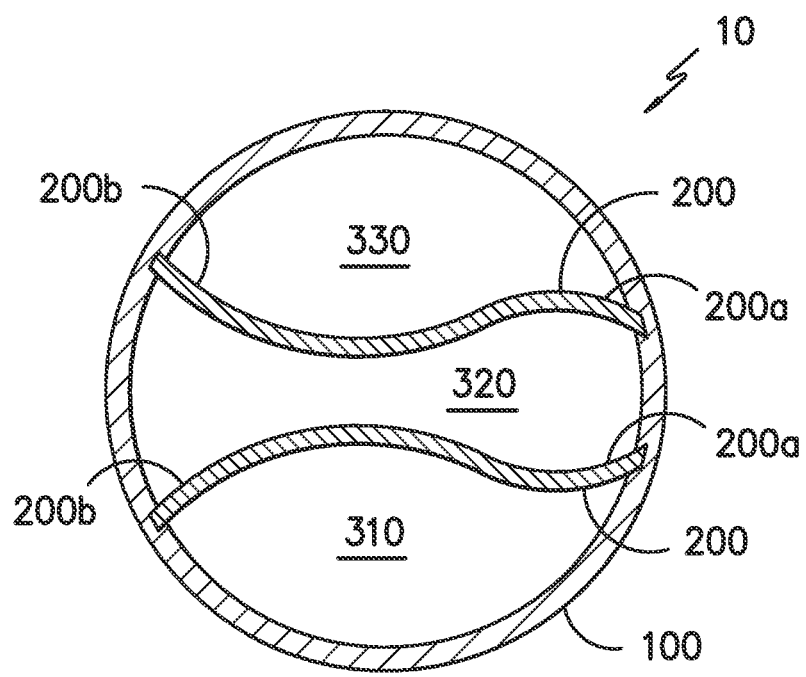
FIG. -2-

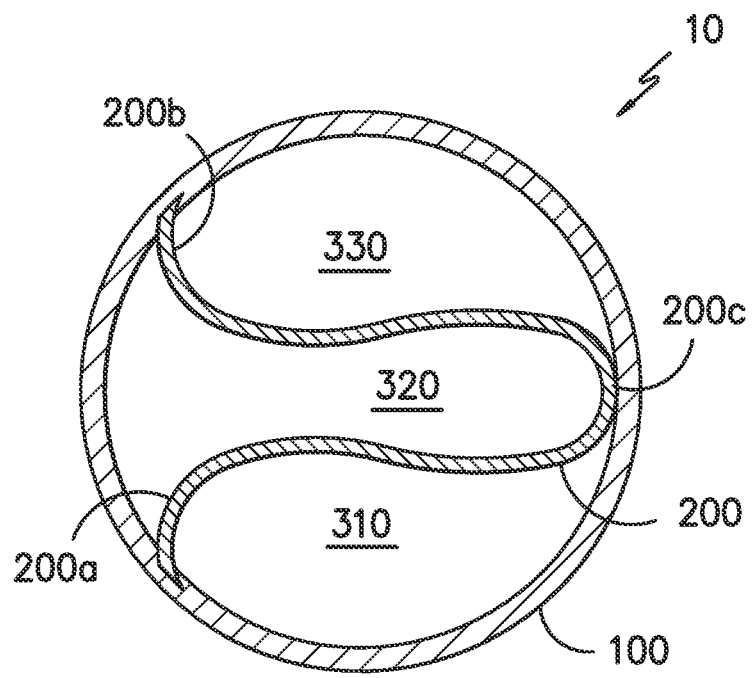
FIG. -3-
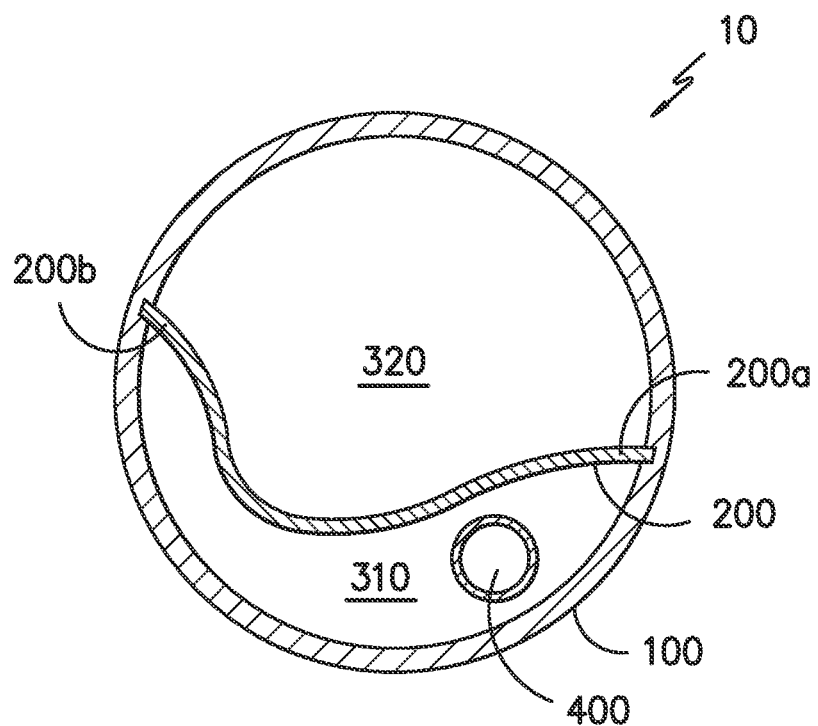
FIG. -4-

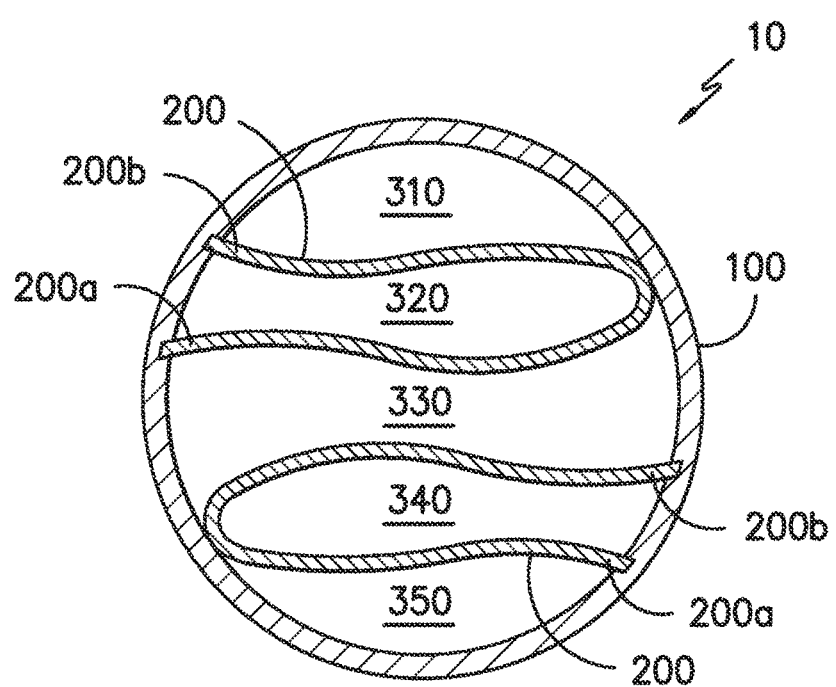
FIG. -5-

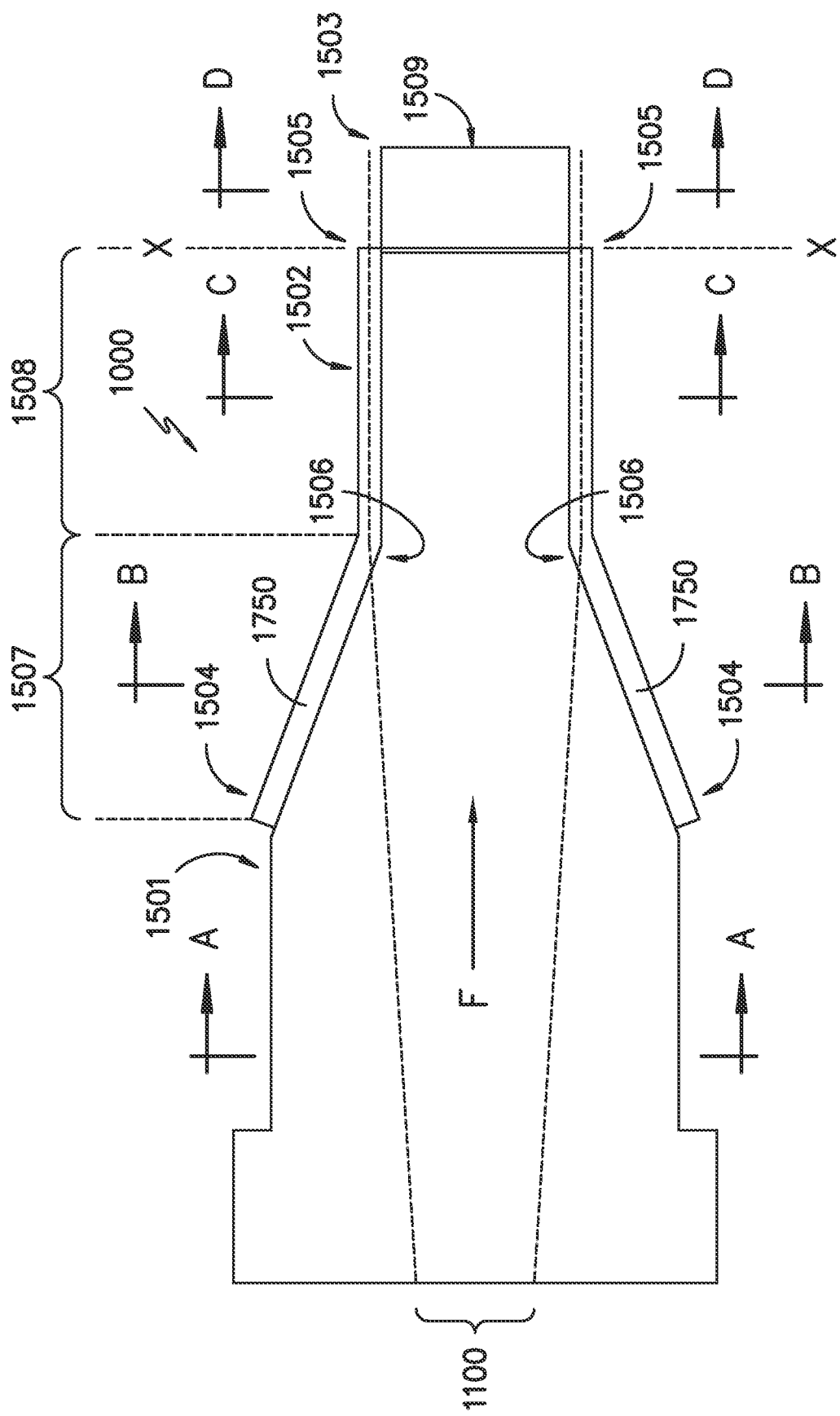
FIG. -6-

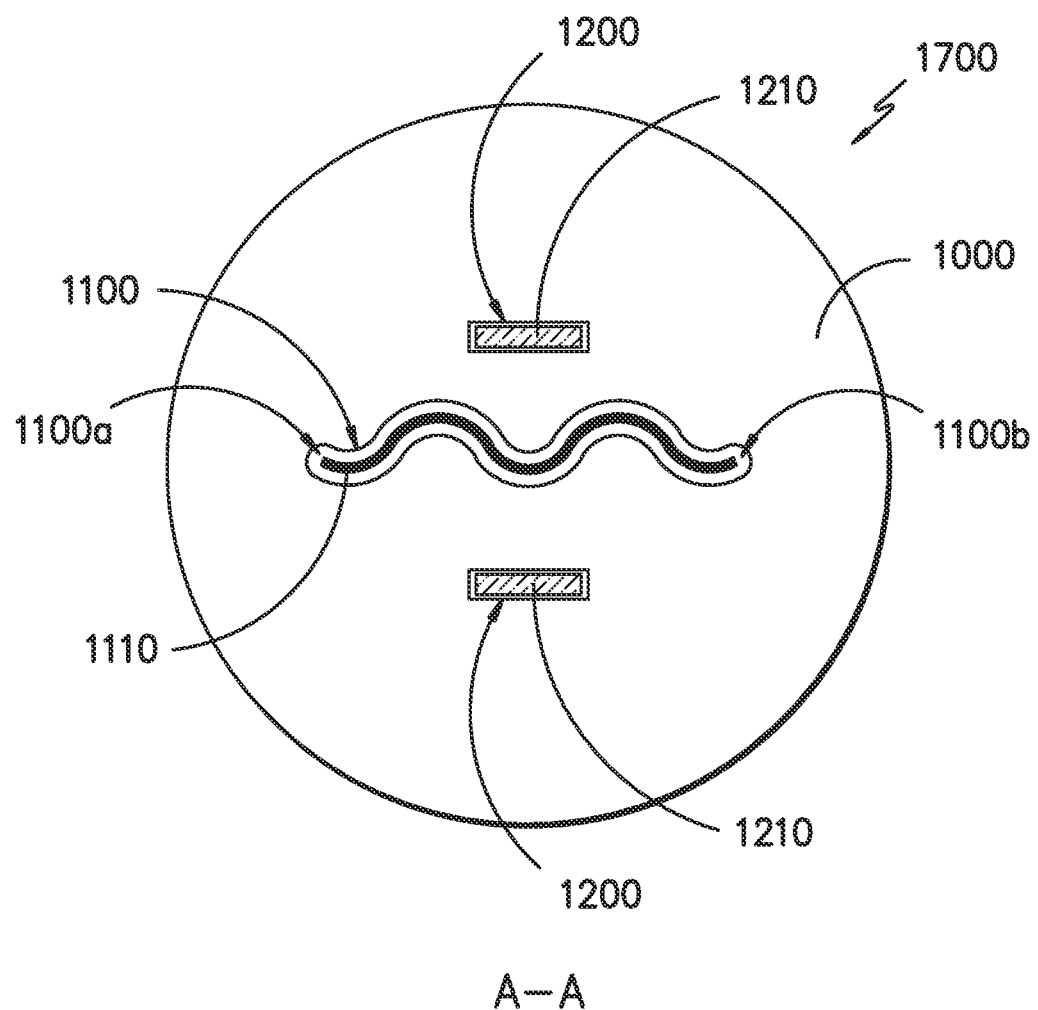
A—A
FIG. —7—

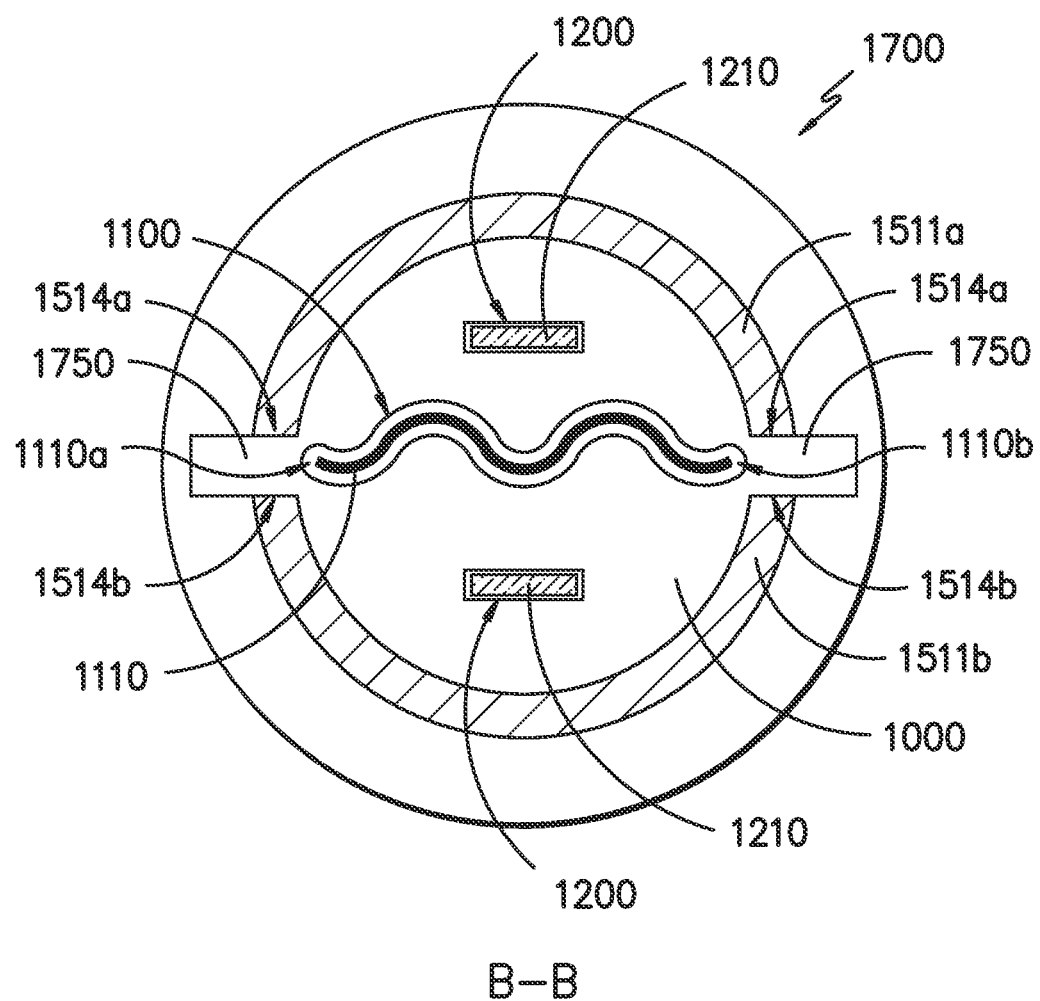
FIG. —8—

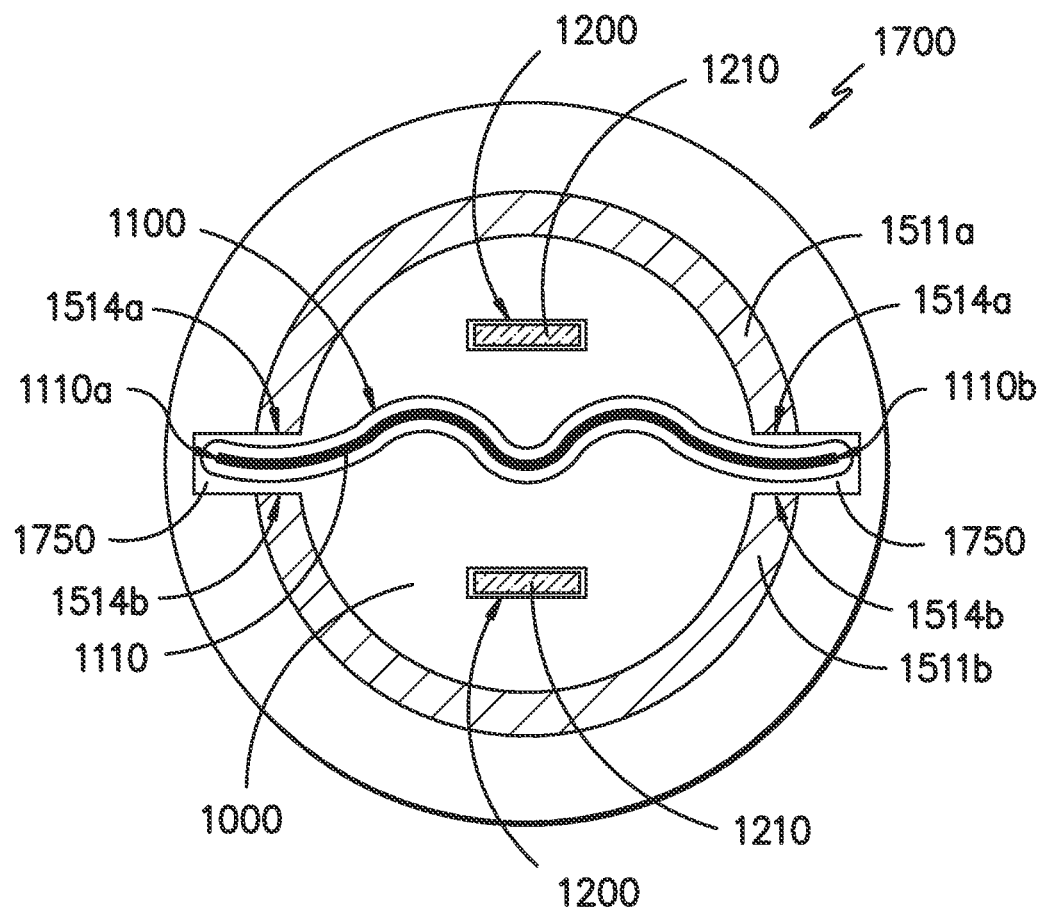
FIG. -9-

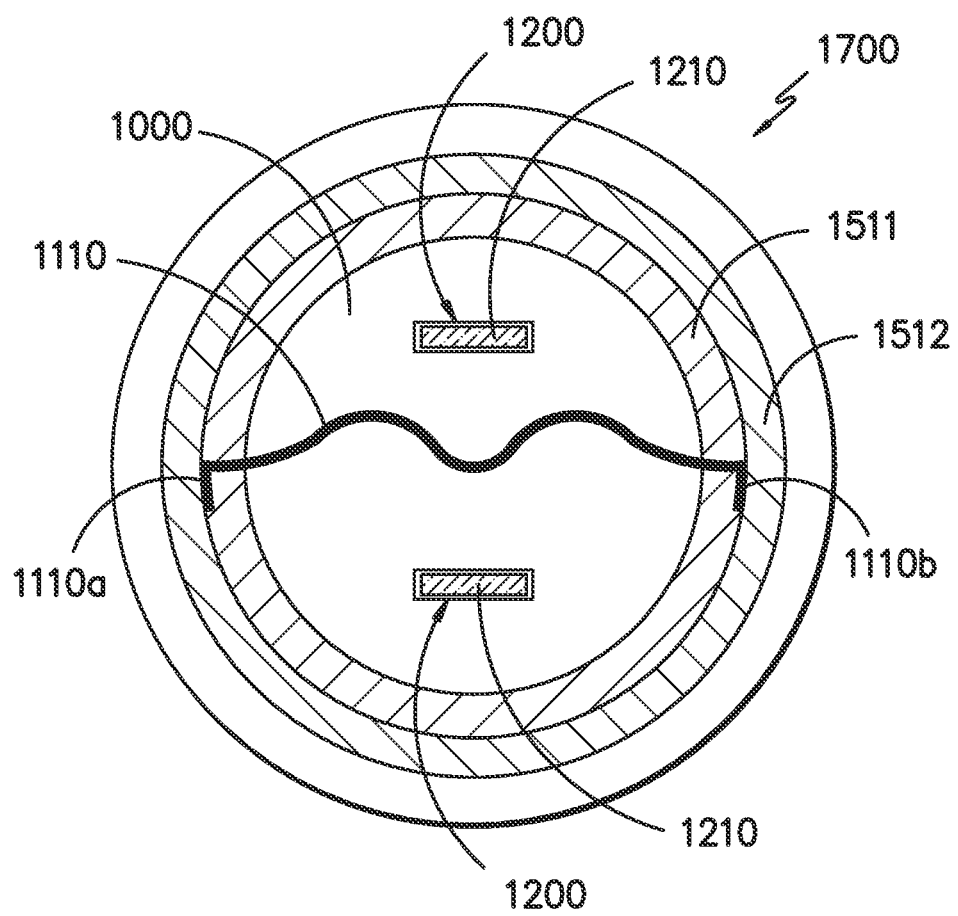
D-D
FIG. -10-

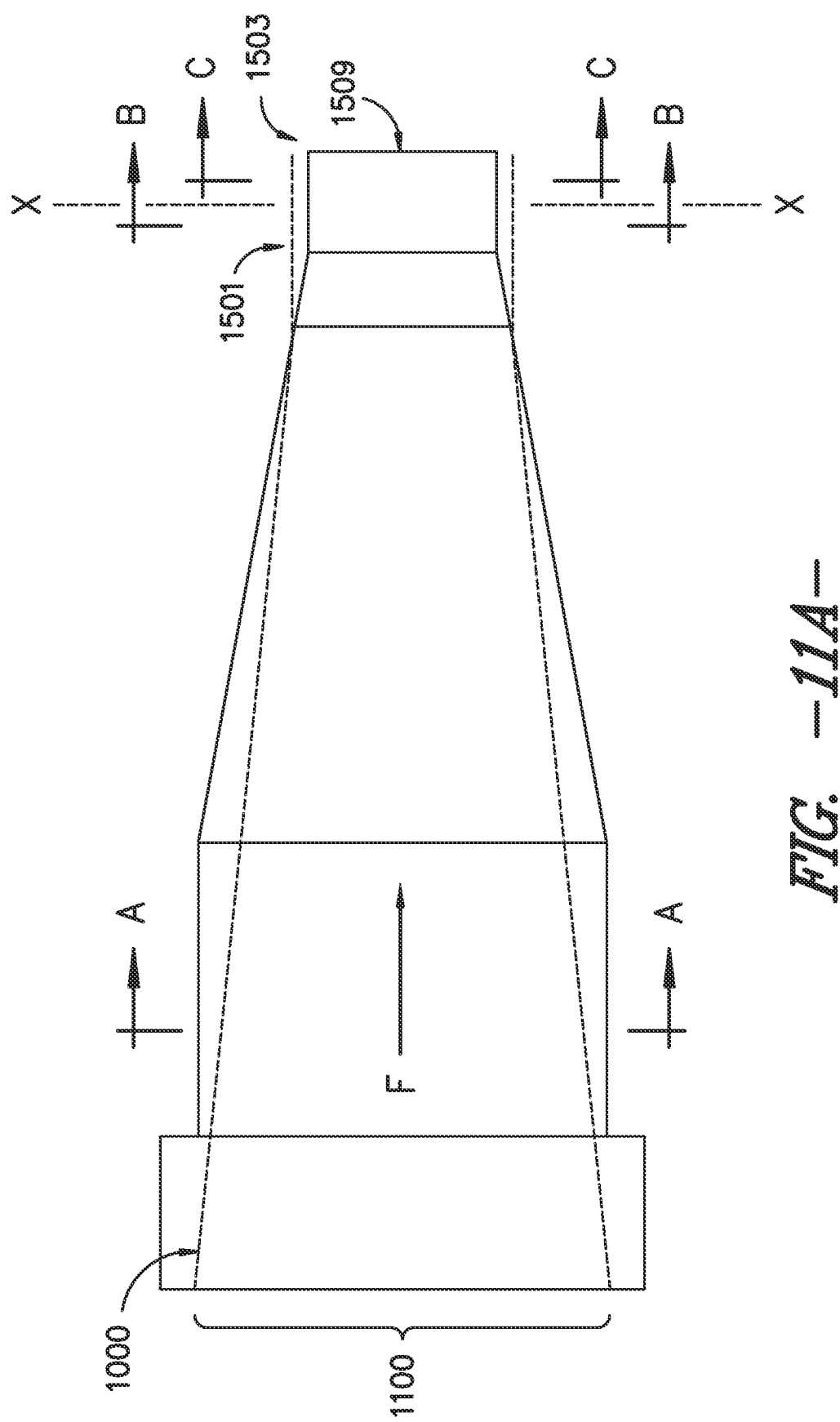
FIG. -11A-

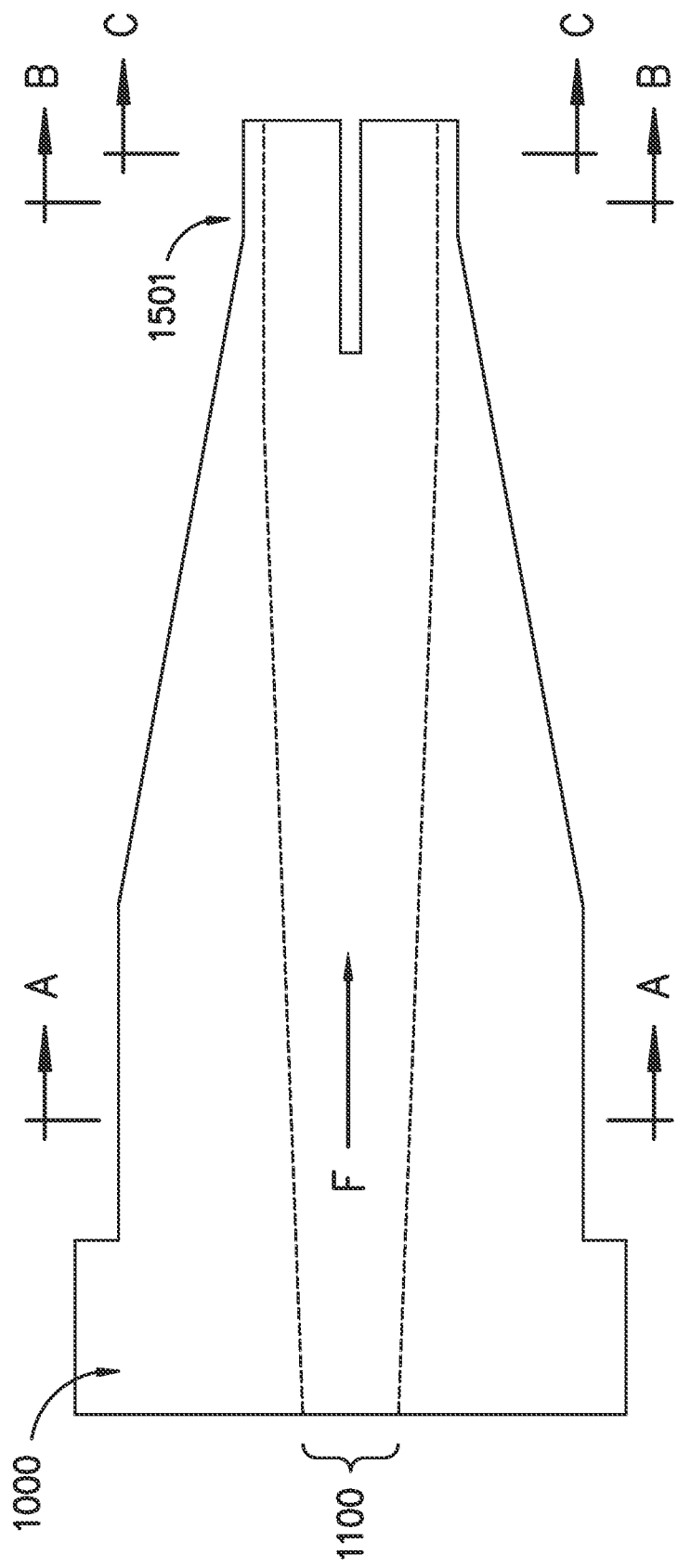
FIG. —11B—

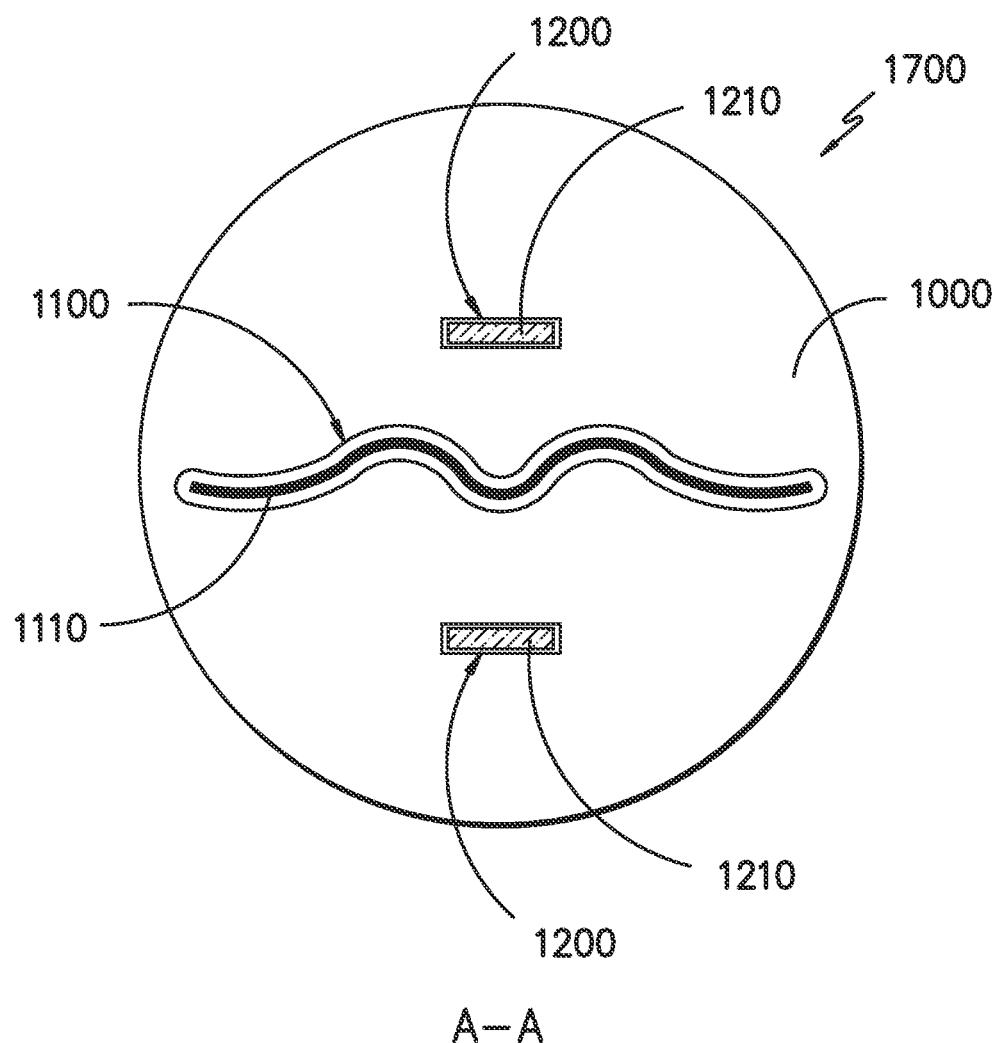
A—A
FIG. -12-

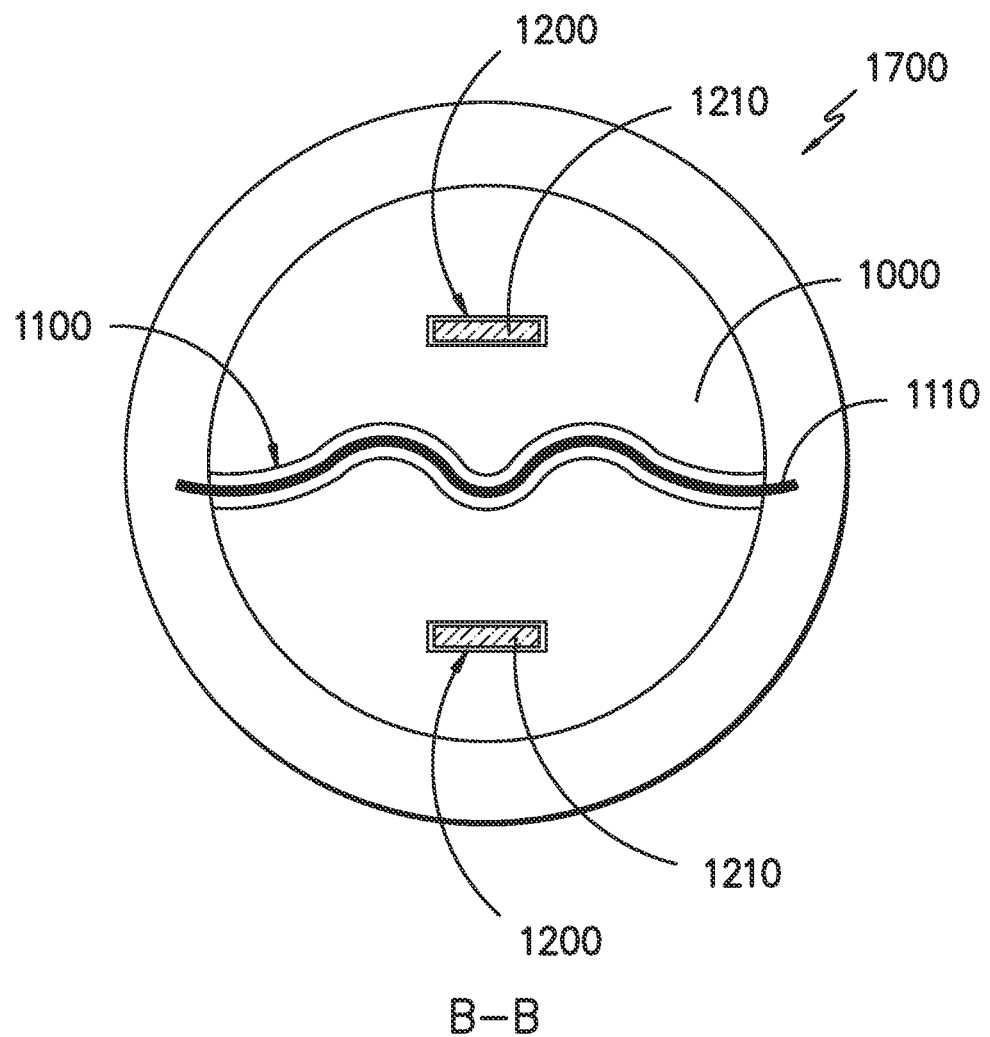
FIG. -13-

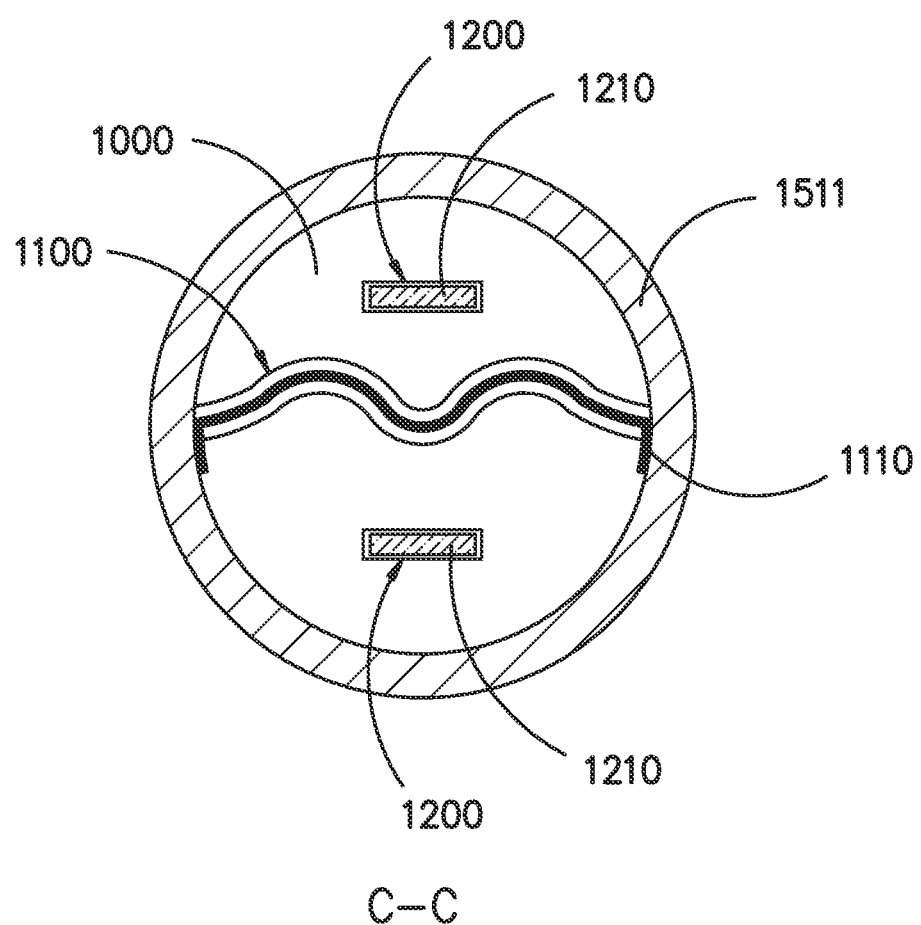
FIG. —14—

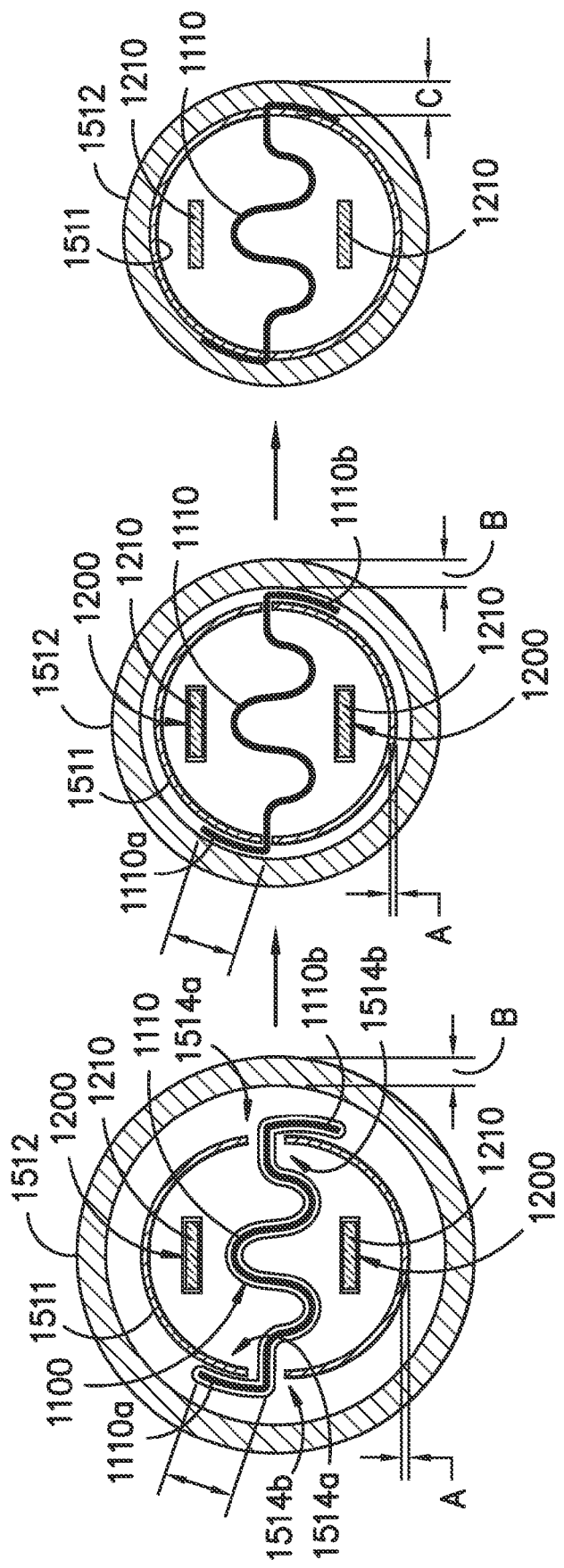

DIVIDED CONDUIT EXTRUSION DIE AND METHOD

PRIORITY CLAIM

This application claims priority to U.S. Provisional Patent Application No. 61/644,761 filed on May 9, 2012, U.S. Provisional Patent Application No. 61/644,760 filed on May 9, 2012, U.S. Provisional Patent Application No. 61/656,290 filed on Jun. 6, 2012, U.S. Provisional Patent Application No. 61/730,525 filed on Nov. 28, 2012, and U.S. Provisional Patent Application No. 61/730,526 filed on Nov. 28, 2012. The foregoing provisional patent applications are incorporated herein by reference for all purposes.

TECHNICAL FIELD

The subject matter of the present disclosure relates generally to an extrusion die and a method for creating divided conduits into which cables, such as fiber optic cables, coaxial cables, electrical cables, electrical wiring, and the like, may be positioned.

BACKGROUND

Cable, such as fiber optic communication cable, is often provided underground in great lengths, and may even extend for many miles. It is known in the art to bury the cable in the ground so that the area above-ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable during in-ground installations. The conduit, which is often formed from lengths of polyvinyl chloride tubing, polyethylene tubing or the like, is laid in the ground, after which a rope is placed in the conduit either by blowing or rodding. The rope, in turn, is attached to one of the communication cables. By pulling the rope from one end of the conduit, the cable is drawn through the conduit into position. Once placed within the conduit, the cable is protected from damage which may be caused by weather, water, and the like.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit that already contains a first cable. When a rope is blown or "snaked" into a conduit already containing a cable (or when a second cable is "snaked" through a conduit with a pre-laid cable), the rope (or cable) is often impeded by the first cable. In such cases, the rope (or second cable) becomes tangled with, or twisted around, the first cable, causing damage to the cables.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists, therefore, for a method of creating a conduit, such as an underground communication cable conduit, that has multiple sections or channels into which one or more cables may be installed. A need also exists for an apparatus that that facilitates the formation of such a divided conduit.

SUMMARY OF EMBODIMENTS OF THE INVENTION

The present invention provides an apparatus and method for making a conduit divided into channels by one or more strip-shaped substrates. The channels may be used for cables, such as fiber optic cables, coaxial cables, electrical cables, electrical wiring, and the like. Each divided conduit provides channels that allow e.g., cables to be pulled through without snagging or excessive heat build-up due to friction. In addition, the divided conduits do not allow contact or alternation losses between adjacent cables in other channels of the conduit. Additional objects and advantages of the invention will be set forth in part in the following description, or may be apparent from the description, or may be learned through practice of the invention.

In one exemplary embodiment, the present invention provides an apparatus for forming a conduit having at least one strip-shaped substrate dividing the conduit into channels. The apparatus includes an extrusion die having an exit and defining a flow direction for a polymeric material forming the conduit. The extrusion die includes a first point for the introduction into the extrusion die of the polymeric material forming the conduit, and a slot that is configured for receipt of the strip-shaped substrate. The slot extends along the flow direction of the extrusion die.

In this exemplary embodiment, the extrusion die may further include a second point for the introduction of polymer into the extrusion die. The second point is located along the flow direction downstream of the first point and upstream of the exit to the extrusion die. The extrusion die may include a pair of wings positioned in an opposing manner along sides of the extrusion die and extending in the flow direction along the extrusion die. Such wings define a wing start point along the flow direction that is located between the first point and the second point.

In another exemplary aspect, the present invention provides a method of using an extrusion die to extrude conduit that is divided into channels by at least one strip-shaped substrate. This exemplary method includes the steps of feeding a strip-shaped substrate through the extrusion die; introducing polymeric material into the extrusion die at a first point and causing the polymeric material to move along a flow direction of the extrusion die towards an exit of the extrusion die, wherein the strip-shaped substrate and the polymeric material are separated from each other at the first point; and connecting the polymeric material and the strip-shaped substrate at a point downstream of the first point and upstream of the exit of the extrusion die so as to adhere or embed the strip-shaped substrate with the polymeric material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE FIGURES

An exemplary embodiment of the present invention will now be described by way of example, with reference to the accompanying figures, wherein:

FIG. 1 is an illustration of one exemplary embodiment of a divided conduit of the invention having one strip-shaped substrate forming two channels.

FIG. 2 is an illustration of one embodiment of a conduit of the invention having two strip-shaped substrates forming three channels.

FIG. 3 is an illustration of one embodiment of a conduit of the invention having one strip-shaped substrate forming three channels.

FIG. 4 is an illustration of one embodiment of a conduit of the invention having one strip-shaped substrate forming two channels, where the strip-shaped substrate is moved towards the inner surface of the conduit.

FIG. 5 is an illustration of one embodiment of a conduit of the invention having two strip-shaped substrates forming five channels.

FIG. 6 illustrates one embodiment of an extrusion die design that comprises a central pin design.

FIGS. 7-10 illustrate different cross-sections of the extrusion die of FIG. 6.

FIGS. 11A and 11B illustrate another exemplary embodiment of an extrusion die design that comprises a central pin design.

FIGS. 12-14 illustrate different cross-sections of the pin of FIGS. 11A and 11B.

FIGS. 15A, 15B, and 15C provide cross-sectional views of an exemplary embodiment of a divided conduit of the present invention.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The term "strip-shaped substrate" refers to a long strip of flexible material made of any suitable material such a textile or film. The term "longitudinal edges" refers to the edges along the length of the strip-shaped substrate. The term "longitudinal axis" refers to the axis of the strip-shaped substrate along its length. "Integral", in this application, means that two of more materials are connected with each other without the further use of any glues or adhesives. The divided conduit may be considered to be integral.

Referring now to FIG. 1, there is shown one embodiment of the divided conduit 10. In FIG. 1, the conduit 100 contains one strip-shaped substrate 200. The strip-shaped substrate 200 has two longitudinal edges, a first longitudinal edge 200a and a second longitudinal edge 200b, both of which are adhered to the inner surface 100a of the conduit 100. This forms two channels 310 and 320 where cables or other elongated structures may be placed. The cables or other elongated structures may be placed into the channels during the formation of the divided conduit, after the conduit is formed, or after the conduit is installed. The divided conduit formed is flexible and a lower weight than some alternative technologies.

The conduit 10 (also sometimes referred to as a pipe or tube), may be any suitable conduit formed from an extrudable material such as a polymeric material or, more specifically, a thermoplastic. The conduit may have any suitable wall thickness, inner diameter, and outer diameter. Conduits for use in the fiber optic field tend to have an inner diameter of about 12 mm to 50 mm. In other embodiments, the conduit may have a very large inner diameter, for example from about 100 mm to 150 mm, or may have a very small diameter such as less than about 50 mm.

The conduit is preferably flexible. In one embodiment, the conduit is formed from a polymeric material including a polymer selected form the group consisting of polyethylene, polypropylene, polyester, and polyvinyl chloride. The conduit may contain a bumpy finish to reduce the amount of contact the film has with the cable, pull line, or other elongated structure. In one embodiment, the inner or outer surface of the conduit has a textured surface. One example of a textured surface is an "orange peel" finish, where the texture resembles the bumpy surface of the skin of an orange (fruit). This textured surface may serve to reduce the coefficient of friction and allow for easier insertion of cables or other elongated structures. The conduit may be smooth-wall, corrugated, or the like.

The strip-shaped substrate 200 may be formed of any suitable material. The strip-shaped substrate should be flexible, have a low coefficient of friction to avoid cable damage and preferably have a high strength to avoid tearing during cable installation. In one embodiment, the strip-shaped substrate 200 should be able to withstand the extrusion temperatures of the thermoplastic polymer used to form the conduit.

Preferably, the coefficient of friction for the strip-shaped substrate (dynamic or sliding coefficients of friction) is between about 0.06 to about 0.14, and a narrower range of about 0.08 to about 0.13, may also be used. In one embodiment, the breaking tensile strength of the present fabric is in the range of from about 45 kg/cm to about 70 kg/cm. In another embodiment, the elongation percentages of the strip-shaped substrate are between 2% and 5% at 22.5 kg of force and between 5% and 10% at 45.5. Kg of force. The strip-shaped substrate preferably has a thickness of about 0.025 inches to 0.100 inches. The strip-shaped substrate preferably has a breaking strength of about 200 lbs/cm to 600 lbs/cm. The strip-shaped substrate preferably has air permeability of 10 $cm^3/cm^2/s$ to 70 $cm^3/cm^2/s$. Preferably the strip-shaped substrate has a rigidity of between about 100 and 400 grams force as measured by ASTM D6827.

In one embodiment, the strip-shaped substrate 200 is a strip-shaped textile. The strip-shaped textile used may be any suitable textile, but is preferably one that is flexible, has a low coefficient of friction, and a high tensile strength. The textile may be a knit, woven, non-woven, or unidirectional. The strip-shaped textile may have additional functional chemistries such as low friction, fire resistance, adhesion, or color added. The chemistries may be added to the yarns during yarn formation or applied onto the yarns before or after textile formation. In one embodiment, the textile has a weight of about 2 to 20 ounces per yard and in another embodiment has a weight of about 10 to 12 ounces per yard. The space between the yarns within the textile will aid in breathability of the textile and the flexibility of the divided conduit. Further, having these shapes should allow for easier movement of the strip-shaped textile within the divided conduit to change the size of the channels and make it easier to install cables in the empty channels. In another embodiment, the fabric preferably has high elongation, high temperature resistance, low shrinkage, and low coefficient of friction.

In one embodiment, the strip-shaped textile is a woven textile. The fabric base may also be, for example, plain, satin, twill, basket-weave, poplin, jacquard, and crepe weave textiles. Preferably, the woven textile is a plain weave textile. It has been shown that a plain weave has good abrasion and wear characteristics. A twill weave has been shown to have good properties for compound curves so may also be preferred for some strip-shaped textiles. The end count in the warp direction is between 35 and 70 in one embodiment. In another embodiment the end count may be between 5 and 50, more preferably between about 15 and 30 epi. The denier of the warp yarns is between 350 and 1200 denier in one embodiment. In another embodiment, the denier of the warp yarns may be between about 120 and 330 d. In one embodiment, the textile is air permeable which increases the flexibility of the divided conduit and may allow for easier movement of the strip-shaped textile within the divided conduit to change the size of the channels and make it easier to install cables in the empty channels.

In another embodiment, the strip-shaped textile is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the strip-shaped textile is a multi-axial, such as a tri-axial fabric (knit, woven, or non-woven). In another embodiment, the strip-shaped textile is a bias fabric. In another embodiment, the strip-shaped textile is a non-woven. The term non-woven refers to structures incorporating a mass of yarns that are entangled and/or heat fused so as to provide a coordinated structure with a degree of internal coherency. Non-woven fabrics for use as the strip-shaped textile may be formed from many processes such as for example, meltspun processes, hydroentangeling processes, mechanically entangled processes, stitch-bonded and the like. In another embodiment, the strip-shaped textile is a unidirectional textile and may have overlapping yarns or may have gaps between the yarns.

The yarns making up the strip-shaped textile forming the strip-shaped substrate 200 may be any suitable yarn. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

Some suitable materials for the yarns include polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof.

In one embodiment, the yarns of the textile have a greater melting temperature than the thermoplastic polymer forming the conduit so they will not melt during the extrusion process forming the divided conduit. In another embodiment, the yarns do not have a melting temperature (such as yarns from a thermoset polymer or some natural fibers), but must be able to withstand the extrusion conditions of the conduit without significant loss in physical properties.

In one embodiment, the textile contains warp yarns and weft yarns which are monofilament. In another embodiment, the warp yarns are monofilament and the weft yarns are multi-filament. In another embodiment, the warp yarns are monofilament and the weft yarns are an alternating arrangement of monofilament and multifilament yarns. In another embodiment, the warp yarns and weft yarns are multi-filament. In another embodiment, the warp yarns are multi-filament. In another embodiment, the warp yarns are multifilament and the filling yarns are monofilament. The phrase "alternating arrangement" refers to a repeating pattern of monofilament to multifilament yarns. In one embodiment, the arrangement of monofilament to multifilament yarns is 1:1. Other ratios, such as 1:2, 1:3, 2:3, 3:4, or 3:5, for example, may also be employed, as product specifications dictate. For the embodiments containing monofilament yarns, the denier of the yarns is preferably between about 200 and 800 denier. For the embodiments containing multifilament yarns, the denier of the yarns is preferably between about 200 and 1,000 denier.

In one exemplary embodiment, the strip-shaped substrate may be constructed from a plurality of textile or fabric elements that have been sewn or woven together. For example, multiple, distinct fabric elements may be woven or sewn together so that the elements are all connected at a line extending along their length (i.e., longitudinally). Such a construction would create a strip-shaped substrate having multiple longitudinal edges that can be adhered to, or embedded in, the conduit. Other constructions created from multiple fabric elements may be used for the strip-shaped substrate as well.

The strip-shaped substrate 200 may also be a strip-shaped film. Preferably, this film is made of a thermoplastic polymer, but may also be made of any other suitable material including a thermoset. Some suitable thermoplastic polymers include, but are not limited to polypropylene, polyethylene, polyester, polyvinyl alcohol, blends thereof, and co-polymers thereof. Preferably, the film is formed from a thermoplastic selected from the group consisting of polyester, polyolefin, and polyamide. The strip-shaped film may have perforations or be continuous. Perforations will aid in breathability of the film and the flexibility of the divided conduit. Further, having perforations should allow for easier movement of the strip-shaped film within the divided conduit to change the size of the channels and make it easier to install cables in between empty channels. Further, the strip-shaped film may be fiber reinforced or not. A film containing fibers may increase the breaking strength of the film. In one embodiment, at least one of the surfaces of the strip-shaped film has a textured surface. One example of a textured surface is an "orange peel" finish. This textured surface may serve to reduce the coefficient of friction and allow for easier insertion of cables or other elongated structures.

In some embodiments, an already formed, free-standing strip-shaped film is inserted into the conduit during (or directly after) the extrusion of the pipe. In one embodiment, this strip-shaped film is oriented, meaning that after extrusion the film is further stretched in at least one axis. This orienting serves to increase the dimensional stability and strength of the film to be placed into the conduit. In one embodiment, the polymer that the film is made of has a higher melting temperature than the polymer used to form the conduit. In another embodiment, the film does not have a melting temperature (such as thermoset polymer). In this embodiment, the film must be able to withstand the extrusion conditions of the conduit without significant loss in physical properties. During the manufacturing processes, the already formed, free-standing strip-shaped film is introduced into the conduit during or directly after extrusion of the conduit and the film must not lose significant physical properties during this process. The strip-shaped film may have chemistries added to the polymer before film formation or applied onto the formed film to provide for low friction, fire resistance, adhesion, or color. The film may contain a bumpy finish to reduce the amount of contact the film has with the cable, pull line, or other elongated structure.

While in FIG. 1 there is shown the strip-shaped substrate 200 adhered to the inner wall of the conduit 100 on both the first longitudinal edge 200a and the second longitudinal edge 200b, there may be embodiments where only one edge of the strip-shaped substrate is adhered to the inner wall of the conduit 100.

In one embodiment, the longitudinal edge(s) (200a, 200b) of the strip-shaped substrate 200 are embedded into the inner surface of a layer of polymeric material of the conduit. Being "embedded" means that the edges of the strip-shaped substrate are not just adhered to the inner surface but actually reside within the polymeric material forming the wall of the conduit such that the edge is completely covered, surrounded, and entrenched by the material of the conduit.

In one embodiment, the width of the strip-shaped substrate 200, defined as the distance between the first longitudinal edge 200a and the second longitudinal edge 200b is between about 32 and 60% of the inner circumference of the conduit. In another embodiment, the width of the strip-shaped substrate 200 is greater than the diameter of the conduit. For example, in FIG. 4, there is shown another embodiment of the divided conduit a longer width of the strip-shaped substrate (or film) is beneficial as it may move towards the inner surface of the conduit into one of the chambers of the divided conduit thus opening the other (unfilled) channel for less friction and easier cable installation.

FIG. 2 illustrates an additional embodiment of the invention where the divided conduit 10 contains a conduit 100 with two strip-shaped substrates 200, each strip-shaped substrates 200 having a first longitudinal edge 200a and a second longitudinal edge 200b adhered to the inner wall of the conduit 100. This forms three channels 310, 320, 330 for the placement of cables or elongated structures. While FIG. 2 is shown with two strip-shaped substrates 200, there may be embodiments having three or more strip-shaped substrates 200.

FIG. 3 illustrates an additional embodiment of the invention where the divided conduit 10 contains a conduit 100 with one strip-shaped substrate 200, having a first longitudinal edge 200a and a second longitudinal edge 200b adhered to the inner wall of the conduit 100 as well as an additional point 200c of the material (between the first edge 200a and the second edge 200b) optionally adhered to the inner wall of the conduit 100. The additional point 200c runs along the longitudinal axis of the fabric. The conduit 100 having one strip-shaped substrate 200 forms a divided conduit having three channels 310, 320, 330.

One process for forming the divided conduit begins with an already formed, free-standing, strip-shaped substrate 200. This already formed strip-shaped substrate 200 is then introduced to the conduit extrusion process where the first and second edges 200a, 200b of the strip-shaped substrate 200 are adhered to or embedded into the polymeric material forming the wall or inner surface of the conduit 100 during the extrusion of the conduit or directly after the extrusion. In some embodiments, this step occurs when the strip-shaped substrate 200 is slightly below, slightly above, or at its glass transition temperature, $T_g$. In this embodiment, the materials of strip-shaped substrate 200 (yarns for a textile or polymer for a film) preferably have a higher melting temperature than the polymer forming the conduit. In the case where the materials of the strip-shaped substrate 200 do not have a melting temperature, preferably strip-shaped substrate must be able to withstand the conduit forming (extrusion processing) conditions without a significant loss in physical properties.

In one exemplary method of the extrusion process where the conduit is formed, the strip-shaped substrate 200 is introduced into the forming conduit while the conduit is still at least partially molten and pressed into the surface of the molten conduit with, for example, a roller or a flexible rib. This allows the edges of the strip-shaped substrate 200 to be adhered or embedded into the material of the conduit. Multiple strip-shaped substrates can be introduced into the forming conduit resulting in multiple channels such as shown in FIGS. 2 and 5.

It has been found that in some extrusion die systems where a strip-shaped substrate comprising a fabric is used certain problems may occur. For example, when such a strip-shaped substrate is introduced into the molten polymer within the extrusion die system, sometimes the pressure of the extruding molten polymer causes the polymer to back flow through a slot in a pin of the extrusion die that carries the strip-shaped substrate 200 and also into the fabric of the strip-shaped substrate 200. This causes the pin to become blocked and shuts down production while the polymer can be chipped, burned off, or otherwise removed from the extrusion pin.

One way to solve such possible extrusion difficulties is to use an extrusion die having one or more wings. More particularly, one exemplary embodiment of an extrusion die 1700 includes an extrusion pin 1000 to form a pair of wings 1750 as is illustrated in FIG. 6, which is a top view. In this exemplary embodiment, wings 1750 are positioned in an opposing manner along the sides of the extrusion pin 1000 and extend in a flow direction F along the sides of extrusion pin 1000. The pin 1000 is a part of extrusion die 1700 as shown in FIG. 7. However, as will be understood using the teachings disclosed herein, extrusion die 1700 is not limited to a pin construction to provide wings 1750 or other features of the invention and e.g., extrusion die 1700 may be constructed from e.g., stacked plates configured to provide the desired cross-sections along the flow path of the die that will now be described. FIGS. 8-11 are cross-section illustrations of extrusion die 1700 and pin 1000 for greater detail as will be further described.

Continuing with FIG. 6, for this exemplary embodiment, there are at least two points, a first point 1501 and a second point 1502, where molten polymeric material is introduced into the die 1700 and around the pin 1000 to form the polymer conduit or pipe. As shown in FIG. 6, the polymeric material moves through die 1700 in an overall flow direction F along a flow path created within extrusion die 1700 as indicated by arrow F in FIG. 6. Second point 1502 is located along flow direction F at a position downstream of first point 1501 and upstream of exit 1503 to extrusion die 1700. As such, the second point 1502 is located closer to the exit 1503 of the extrusion die 1700 than the first point 1501.

While the entry areas for molten polymers are called points, this is not to imply that the polymer or polymeric material is introduced in a single point, the polymer is typically added around the entire circumference of the pin at this "point". In other embodiments, there is only one point in the die that molten polymer is introduced. In other embodiments, there are three or more points in the die that molten polymer is introduced.

Additionally, the wings 1750 define a wing start point 1504 that is located along flow direction F between first point 1501 and second point 1502. A wing finish point 1505 is located at or near exit 1503. As shown, the wings 1750 converge toward each other along flow direction F. More particularly wings 1750 include an upstream section 1507 where the wings 1750 converge toward each other and a downstream section 1508 where the wings 1750 are substantially parallel to each other along flow direction F.

A slot 1100 configured for receipt of a strip-shaped substrate 1110 extends in the flow direction F along pin 1000. For this exemplary embodiment, the slot 1100 also diverges along flow direction F as shown. Upstream of wing start point 1504, the slot 1100 is positioned outside of wings 1750 such that the two do not intersect. At intersection point 1506, the slot 1100 and the pair of wings 1750 intersect as shown.

FIG. 7 illustrates a cross-section taken of the pin 1000 at the A-A line shown in FIG. 6. The A-A line is before the first point 1501 so there is no layer of polymeric material around pin 1000 at this location along flow direction F. The A-A line is also before wing start point 1504 so the wings 1750 also do not appear yet. The strip-shaped substrate 1110 is fed into pin 1000 so that strip-shaped substrate 1110 is located within slot 1100. Additional and optional pull tape slots 1200 with the pull tapes 1210 that have been fed into pin 1000 are also shown. A small pipe or channel can be extended from the end face 1509 of pin 1000 to prevent the pull tape 1210 from adhering to the polymeric material that may still be tacky when first exiting extrusion die 1700 (FIG. 6). Note that in FIG. 7 the slot 1100 is completely surrounded by pin 1000 and is not in communication with the polymeric material 1511, which is moving in the flow path created by the extrusion die 1700 around pin 1000.

FIG. 8 illustrates a cross-section taken of the pin 1000 at the B-B line. The B-B line is after the first point 1501 where polymeric material 1511 has been introduced into die 1000 so as to provide opposing portions 1511a and 1511b of polymeric material 1511 that will eventually create a first layer of polymeric material 1511 around the pin 1000 in order to form the desired conduit. The polymeric material 1511 moves along flow direction F towards the exit 1503 of the extrusion die 1700.

The pair of wings 1750 in the pin at the B-B line appear in this view but the longitudinal edges 1110a and 1110b of the strip-shaped substrate 1110 are not yet positioned in the pair of wings 1750. These wings 1750 are part of the pin 1000 meaning that they are e.g., metal and so the first layer of polymer 1511 is not continuous around the circumference of the pin 1000 but, instead, is formed as two portions 1511a and 1511b—which need not be perfect half portions as shown in the figures. Thus, at line B-B the strip-shaped substrate 1110 (and slot 1100) is still surrounded by pin 1000 and the wings 1750 such that the strip-shaped substrate 1110 is still separated from—i.e., not in contact with—the first layer of polymeric material 1511.

FIG. 9 illustrates a cross-section taken of the pin 1000 at the C-C line, which is downstream of first point 1501 and second point 1502 but upstream of exit 1503. The slot 1100 extends within the wings 1750 such that the strip-shaped substrate 1110 extends past or outside the distal edges 1514 of the first polymer layer 1511, but the strip-shaped substrate 1110 is still surrounded by the pin 1000 and the wings 1750 such that the strip-shaped substrate is not in contact with the first polymer layer 1511.

More particularly, the first layer 1511 of polymeric material has two portions 1511a and 1511b. Each portion 1511a and 1511b has a pair of distal edges 1514a and 1514b, respectively, that are positioned adjacent to each other with the longitudinal edges 1110a and 1110b of the strip-shaped substrate 1110 positioned therebetween and within wings 1750.

In different embodiments, the distance the strip-shaped substrate 1110 extends past the pin 1000 or outside of the distal edges 1514a and 1514b may vary. For example, this distance may be shorter than the thickness of the first layer 1511, the same thickness as the first layer 1511, or longer than the thickness of the first layer 1511 such that the strip-shaped substrate 1110 extends past the first layer 1511 as shown in FIG. 10.

As the pair of wings 1750 on the pin 1000 end moving along flow direction F, the two portions of polymeric material 1511a and 1511b that will from first layer 1511 come in contact and adhere, thereby sandwiching or capturing the fabric or strip-shaped substrate 1110 between them. More particularly, the strip-shaped substrate is embedded between the distal edges 1514a and 1514b of the portions 1511a and 1511b of the first polymer layer 1511 as these portions are joined together to form a divided conduit with channels.

FIG. 10 illustrates a cross-section taken of the pin 1000 at the D-D line. The D-D line is after the second point 1502 wherein polymeric material has been introduced into the extrusion die 1700 and caused to move along flow direction F towards exit 1503 so as to form a second layer 1512 of polymeric material around the first layer 1511 of polymeric material. As such, there are two layers of polymeric material (a first layer 1511 and a second layer 1512) which will form the pipe or conduit in this exemplary embodiment.

The line X-X on the FIG. 6 shows the point at which the fabric is exposed to, or embedded within, the extrudant of polymeric material 1511. The line D-D is right before the exit 1503 or opening of the extrusion die. The second layer of polymeric material 1512 serves to cover the ends of the strip-shaped substrate 1110 and help ensure good adhesion between the strip-shaped substrate 1110 and the layers of polymeric material 1511, 1512. However, it will be understood that in certain embodiments of the invention, the second layer 1512 may not be added.

FIGS. 11-14 illustrate an alternative embodiment of an extrusion die system. FIG. 11A is a top view of the extrusion die and FIG. 11B is a side view of the extrusion die. While it is shown in the figures that there is only one extrusion point (first point 1501), there may be additional extrusion points within the extrusion die system depending on the end product. The pin 1000 fits into an extrusion die 1700 (shown in FIG. 12). FIGS. 12-14 are cross-section illustrations of the extrusion die 1700 design for purposes of describing even greater detail.

FIG. 12 illustrates a cross-section taken of the pin 1000 at the A-A line. The A-A line is before the first point 1501 so there is not a layer of polymeric material 1511 around the pin yet. The slot 1100 with the strip-shaped substrate 1110 inside may be seen as well as the optional pull tape slots 1200 and the pull tapes 1210. The slot 1100 is completely surrounded by the forming the pin 1000 and is not in communication with the polymer 1511 at this point along flow direction F.

FIG. 13 illustrates a cross-section taken of the pin 1000 at the B-B line. The B-B line is after the first point 1501 so there is a first layer of polymer 1511 (now shown in FIG. 13) within the extrusion die 1700 that will form the conduit. The strip-shaped substrate 1110 and slot 1100 are still surrounded by the pin 1000 such that the fabric is not in contact with the first polymer layer 1511 yet.

FIG. 14 illustrates a cross-section taken of the pin 1000 at the C-C line, which is downstream of first point 1501 and second point 1502 but upstream of exit 1503. The fabric 1110 is has been contacted or connected with first polymer layer 1511 so that strip-shaped substrate 1110 is adhered to the inside surface first layer of polymeric material 1511. A second layer of polymeric material 1512 may also be optionally added onto the first layer of polymeric material 1511.

FIGS. 15A, 15B, and 15C provide[s] cross-sections that illustrate an exemplary sequence of events that occur along flow direction F in the formation of an exemplary conduit 1500 having an inner, first layer 1511 and an outer, second layer 1512 that has been added onto the first layer 1511. As shown in FIG. 15A, the strip-shaped substrate 1110 is initially isolated from the first layer of polymeric material 1511. The slot 1100 is sized to extend past—i.e. outside of—the distal edges 1514a and 1514b of the first layer 1511 of polymeric material. At a point shortly before exit 1503, as shown in FIG. 15B, the strip-shaped substrate 1110 is exposed to the two opposing portions of extruded polymeric material 1511, which are brought together to form the first layer 1511 of the conduit. Finally, as shown in FIG. 15C, the outer, second polymeric layer 1512 is placed onto the inner, first polymeric layer 1511, which locks strip-shaped substrate 1110 into place and completes formation of the conduit 1500. The longitudinal edges 1110a and 1110b of the strip-shaped substrate 1110 are sandwiched or embedded between the first polymeric layer 1511 and the second polymeric layer 1512. It should be understood that while the extrusion die 1700 forms two layers 1511 and 1512 to create conduit 1500, conduit 1500 can appear as one, homogeneous material along a cross-section view after layers 1511 and 1512 are joined together.

It should also be understood that relatively high pressures are used in extrusion die 1700 to cause the polymeric material to travel in the flow direction along the flow path of the die. The location, relative to the exit 1503, at which the strip-shaped substrate 1110 is first exposed to the extruded polymeric material 1511 can affect proper formation of the conduit with the substrate 1110 properly connected thereto. In one exemplary embodiment, the point at which substrate 1110 is exposed to the molten polymeric material is between about ½ inches to about ¾ inches upstream of exit 1503. In another exemplary embodiment, the point at which substrate 1110 is exposed to the molten polymeric material is between about ⅜ inches to about 1¼ inches upstream of exit 1503. In still another exemplary embodiment, the point at which substrate 1110 is exposed to the molten polymeric material is between about ¼ inches to about 1¾ inches upstream of exit 1503.

Continuing with FIGS. 15A, 15B, and 15C, Dimension A represents the thickness of first layer 1511, dimension B represents the thickness of second layer 1512, and dimension C represents the combined thickness of layers 1511 and 1512—i.e. the thickness of the wall of the finished conduit 1500. In one exemplary embodiment, thickness A can range from about 1 percent to about 70 percent of the total thickness C. In another embodiment, thickness A can range from about 5 percent to about 50 percent of total thickness C. In still another embodiment, thickness A can be from about 10 percent to about 30 percent of total thickness C.

It should be understood that the longitudinal edges 1110a and 1110b can be aligned as shown in FIG. 15 or can be aligned with both edges pointing in the same direction. In one exemplary embodiment, the length of the portion extending between first and second layers 1511 and 1512 can be from about 0.125 inches to about 0.625 inches. In another embodiment, the length of the portion extending between first and second layers 1511 and 1512 can be from about 0.313 inches to about 0.438 inches. In still another exemplary embodiment, the length of the portion extending between first and second layers 1511 and 1512 can be about 0.375 inches.

The thickness of slot 1100 relative to the thickness of the strip-shaped substrate 1110 can vary in certain embodiments of the invention. For example, in one exemplary embodiment, slot 1100 has a thickness that is about equal to or less than twice the average thickness of strip-shaped substrate 1110. In another embodiment, slot 1100 has a thickness that is about equal to or less than 1.5 times the average thickness of strip-shaped substrate 1110. In still another embodiment, slot 1100 has a thickness that is about equal to or less than 1.25 times the average thickness of strip-shaped substrate 1110.

As will be understood by one of skill in the art using the teachings disclosed herein, the extrusion die of the present invention is not limited to the extrusion die 1700 having a pin 1000 received therein to create paths through which the polymeric material is extruded. Such a construction has been provided by way of example only. Thus, in addition to pin configurations described above, the extrusion die of the present invention can also be constructed from die plates that are each machined so that each forms a segment of the die and, therefore, part of the flow path for the extruded polymeric material. These individual die plates are then stacked or aligned together to form the overall die with a flow path having cross-sections as described, for example, in the exemplary embodiments and figures set forth above. By way of example, slots for the strip-shaped substrate and, optionally, the pull tapes can be machined into each plate. Each die plate can be machined to create the desired shape for the extruded polymeric material. Other constructions for the extrusion die may be used as well. In another exemplary embodiment of the conduit of the present invention, there are two strip-shaped substrates introduced during the extrusion process to form a conduit having 3 channels 310, 320, and 330 such as shown in FIG. 2. In another embodiment, the strip-shaped substrate 200 is inserted into the extrusion process such that the two edges (first longitudinal edge 200a and second longitudinal edge 200b) are adhered to and/or embedded within the inner wall of the conduit as well as another section of the strip-shaped substrate along its longitudinal axis. In this embodiment, shown in FIG. 3, the first longitudinal edge 200a, second longitudinal edge 200b, and an additional point 200c are adhered or embedded into the polymer of the conduit 100. With the one strip-shaped substrate 200, 3 channels 310, 320, and 330 are created.

The divided conduit may optionally contain pull lines or cords. These may be placed inside the conduit in at least one channel during manufacture of the divided conduit, after conduit formation, or after conduit placement. Pull lines, which are typically tightly woven, relatively flat strips of material, may be used for pulling cables through the channels. However, pull cords having a substantially round cross-section may be used successfully with smaller diameter cables.

In one embodiment, the pull lines are formed of tightly woven, polyester material, which exhibits a tensile strength of between about 400 pounds and about 3,000 pounds. In an alternate embodiment, a twisted round rope (for example, a multi-ply cord) may be used, where such pull cords are made of polypropylene, polyester, and the like.

The divided conduit is designed to contain cables or other elongated objects. These may be placed inside the conduit in at least one channel during manufacture of the divided conduit, after conduit formation, or after conduit placement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of using an extrusion die to extrude conduit that is divided into channels by at least one strip-shaped substrate embedded into the conduit, the method comprising the steps in order:

feeding a strip-shaped substrate having longitudinal edges through a slot within the extrusion die;

introducing a first polymeric material into the extrusion die at a first point and causing the polymeric material to move along a flow direction of the extrusion die towards an exit of the extrusion die forming opposing portions of polymeric material, wherein each opposing portion has a pair of distal edges, wherein the strip-shaped substrate and the polymeric material are separated from each other at the first point, wherein the distal edges of the opposing portions of polymeric material are separated by a pair of wings of the extrusion die, and wherein the slot and the strip-shaped substrate do not extend into the wings of the extrusion die;

extending the slot and the strip-shaped substrate into the wings of the extrusion die such that the strip-shaped substrate extends past and between the distal edges of the opposing portions of polymeric material, wherein the strip-shaped substrate and the opposing portions of polymeric material are separated at this point;

bringing the opposing portions of polymeric material in contact forming a first polymer layer such that the distal edges of polymeric material contact, adhere, and sandwich the strip-shaped substrate, wherein the strip-shaped substrate is embedded into the first polymer layer.

2. The method of claim 1, wherein after the step of embedding the strip-shaped substrate into the first polymer layer, the longitudinal edges of the strip-shaped substrate extend outside of the first layer of polymeric material.

3. The method of claim 1, the method further comprising the steps of:

introducing a second polymeric material in the die at a second point and causing the polymeric material to move along the flow direction of the extrusion die towards an exit of the extrusion die, wherein the second point is located along the flow direction downstream of the first point and upstream of the exit to the extrusion die; and forming a second layer of polymeric material around the first layer of polymeric material of the conduit.

4. The method of claim 1, further comprising the step of feeding a pull tape through the extrusion die.

5. The method of using an extrusion die to extrude conduit as in claim 2, the method further comprising the steps of:

introducing a second polymeric material in the die at a second point and causing the polymeric material to move along the flow direction of the extrusion die towards an exit of the extrusion die, wherein the second point is located along the flow direction downstream of the first point and upstream of the exit to the extrusion die; and forming a second layer of polymeric material around the first layer of polymeric material of the conduit.

6. The method of using an extrusion die to extrude conduit as in claim 3, further comprising the step of feeding a pull tape through the extrusion die.

7. The method of claim 5, wherein the second layer covers the pair of longitudinal edges of the strip-shaped substrate.

* * * * *